UNITED STATES PATENT OFFICE.

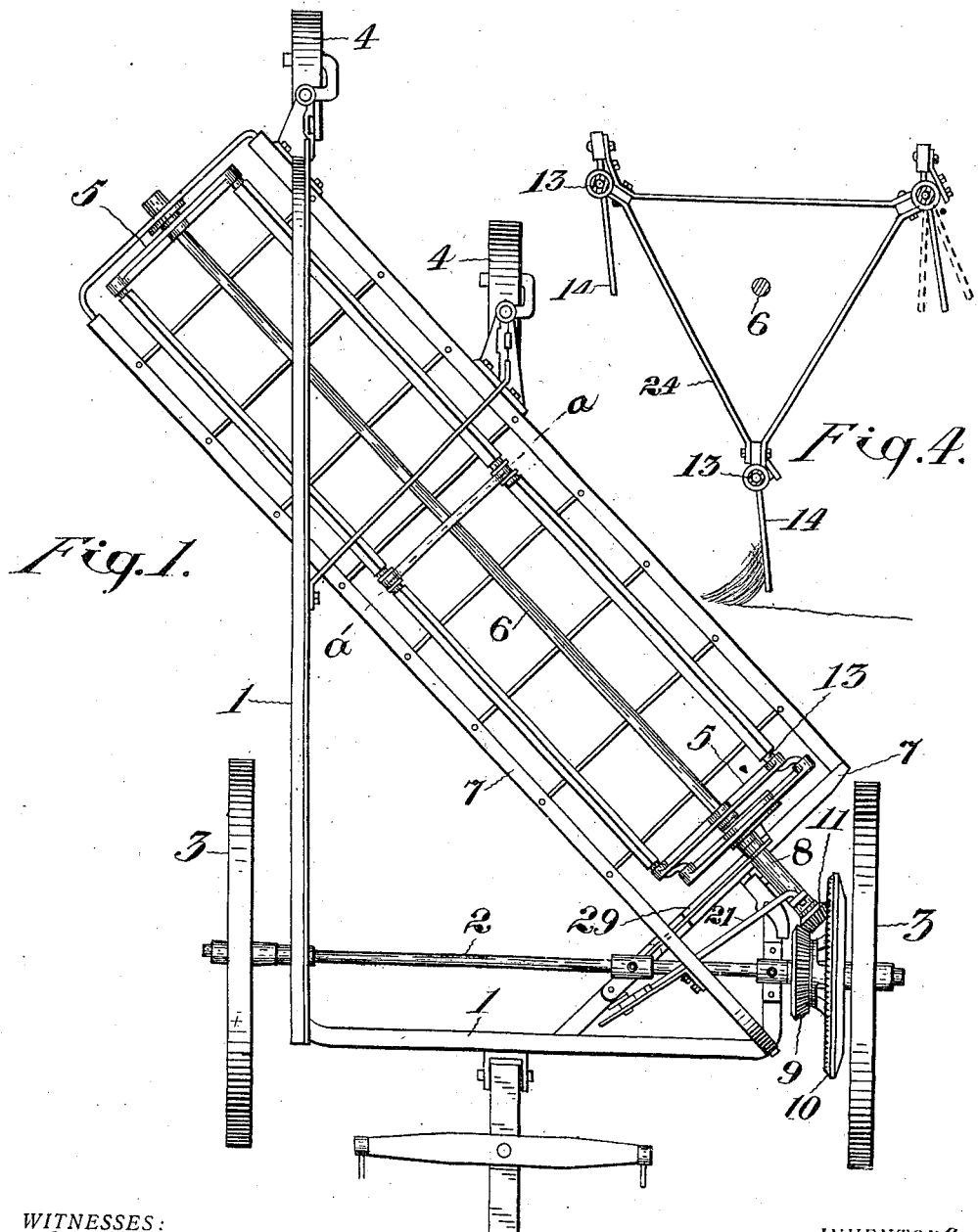

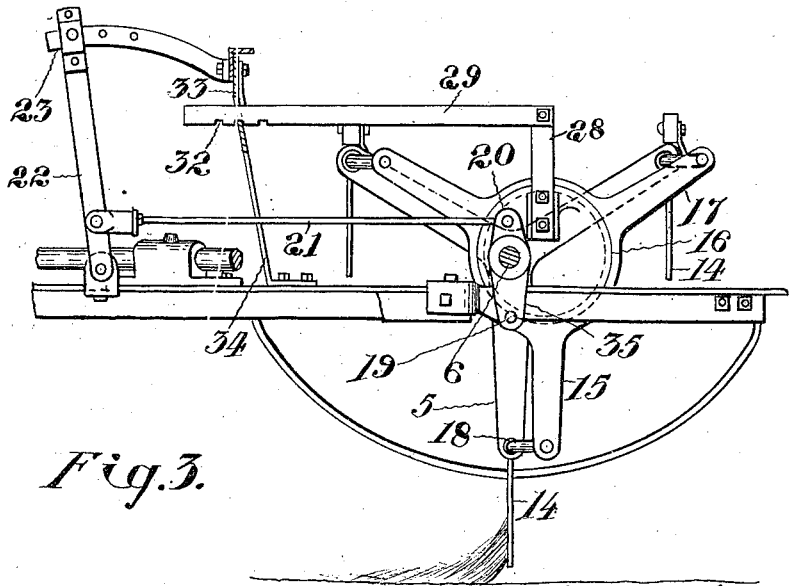
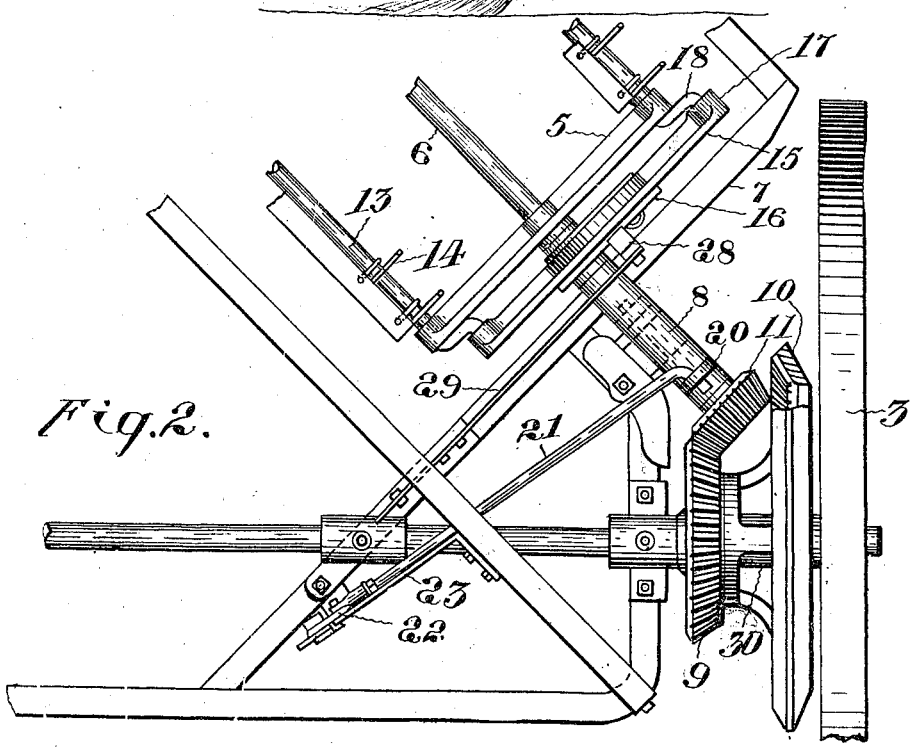

LYMAN MELVIN JONES AND ANDREW JOHNSTON, OF TORONTO, ONTARIO, CANADA, ASSIGNORS TO MASSEY-HARRIS CO. LTD., OF TORONTO, CANADA.

HAY-RAKE.

996,255. Specification of Letters Patent. Patented June 27, 1911.

Application filed September 20, 1909. Serial No. 518,682.

*To all whom it may concern:*

Be it known that we, LYMAN MELVIN JONES and ANDREW JOHNSTON, of the city of Toronto, Province of Ontario, Canada, have invented certain new and useful Improvements in Hay-Rakes, of which the following is a specification.

This invention relates to side delivery hay rakes of the type in which a plurality of bars each provided with a series of teeth are revolved about an axis in such a manner that the teeth are carried around the axis without any material change of their angle relative to the surface of the ground. This is accomplished by the use of a rotating eccentric frame to hold the rake bars in position to maintain the teeth at a constant angle to the horizontal during operation and by the provision of means for shifting the eccentric frame to adjust said angle while in motion so as to adapt the rake to handle light or heavy hay to equal advantage, it being found that no one angle of tooth is suited to all conditions. We also connect the rake bars centrally of their length by a frame independent of the shaft driving the rake bars so that no vibration is transmitted to the said shaft.

Figure 1 is a plan view of the machine. Fig. 2 is an enlarged plan view of the parts more particularly connected with this invention. Fig. 3 is an end elevation of part of the machine, showing particularly the means for adjusting the angle of the teeth. Fig. 4 is a cross section on the line *a—a*, Fig. 1.

In the drawings like letters of reference indicate corresponding parts in the different figures.

While some of the parts shown are old, a general description of the machine will be necessary to enable the present invention to be properly understood.

A frame 1 carries the axle 2 which is suitably secured thereon. On this axle the ground wheels 3 are journaled. The frame 1 is rearwardly extended and carries the trailing wheels 4. The rake carrying frames 5 are carried by a shaft 6 which is journaled on the diagonal part 7 of the frame of the device. The shaft is journaled on the rear end of the frame 7 and at the front end of the frame is journaled in a sleeve 8 transversely movable on the frame as hereinafter described. A sleeve 30 is driven by the ground wheel 3 and has the bevel gear wheel 9 and the internal bevel gear wheel 10 fast thereon. A bevel pinion 11 is secured to the end of the shaft 6. It is evident that by moving the shaft 6 that this bevel pinion may be brought into mesh with either the bevel gear wheel 9 or the internal bevel gear 10, and that the shaft may thus be driven in either direction at will.

The rake carrying frames 5 are suitably shaped to carry the rake bars 13 which are journaled therein and which each carry a series of teeth 14. As the rake carrying frames rotate with the shaft these rake bars will be revolved around the latter as an axis carrying the teeth with them.

The following means are provided for maintaining the teeth at a constant angle to the horizontal during the rotation of the frames 5. For this purpose a second frame 15 is provided which is journaled on a disk 16 eccentric to and loose on the shaft 6. This frame 15 is provided with as many arms 17 as there are rake bars. Each rake bar has a crank arm 18, connected thereto, and these crank arms are pivotally connected with the ends of the arms 17. The eccentric disk 16 has an arm 28 secured thereto to which is pivotally connected a bar 29 adjustably connected with the frame. This adjustment is preferably provided by forming notches 32 formed in a part 34 of the frame of the machine. By this arrangement the eccentric disk 16 may be rotated on the shaft 6 to shift the relative position of the axes of rotation of the frames 5 and 15. The result of this construction is that as the shaft 6 is rotated the teeth 14 are held at a constant angle, while this angle may be varied at any time by adjusting the bar 29. This arrangement will be found to be simpler than the gearing hereinbefore referred to, and will involve less loss of power and friction.

The shaft 6 is moved to move the bevel pinion 11 into or out of gear with the gears 9 and 10 by the following mechanism. The sleeve has an arm 35 formed thereon pivoted at 19 on the frame 7. An arm 20 extends up from the sleeve and has secured thereto a rod 21 secured to the hand lever 22, which will be adapted to engage any ordinary adjusting quadrant 23. By shifting this lever 22 the bevel pinion 11 may be held in mesh with either the bevel gear 9, or the internal bevel gear 10.

In reference to Fig. 4 it will be seen that I connect the rake bars 13 by a triangular frame 24, in the corners of which the rake bars are journaled in order that the angle of the teeth may be adjusted, as hereinbefore referred to. This triangular frame effectively braces the rake bars together so that any whipping of these bars due to centrifugal action is prevented and they are all held in proper relationship to the shaft 6 without any actual connection with the said shaft, so that no vibration or strain is imparted to the latter.

What I claim as my invention is:—

In a hay rake, the combination of a main frame mounted on wheels; a rotary shaft carrying a frame journaled at each end on the main frame; a rake bar journaled on said rotating frame at each end; teeth carried by said rake bar, a crank arm on said rake bar; an eccentric disk loose on said shaft; a second frame journaled on said eccentric disk and having a pivotal connection with said crank arm; an arm connected to said eccentric disk; and a bar pivotally connected to said arm and adjustably connected to the frame of the machine to vary the angle of the teeth relative to the ground.

Toronto, this 10th day of September, 1909.

LYMAN MELVIN JONES.
ANDREW JOHNSTON.

Witnesses:
FREDERICK HOWARD McLEAN,
HAROLD BLANCHARD BEDSON.